Oct. 4, 1960  C. J. MARCHETTI  2,954,828
LAMINATED AIRFOIL STRUCTURE
Filed June 10, 1954  3 Sheets-Sheet 1
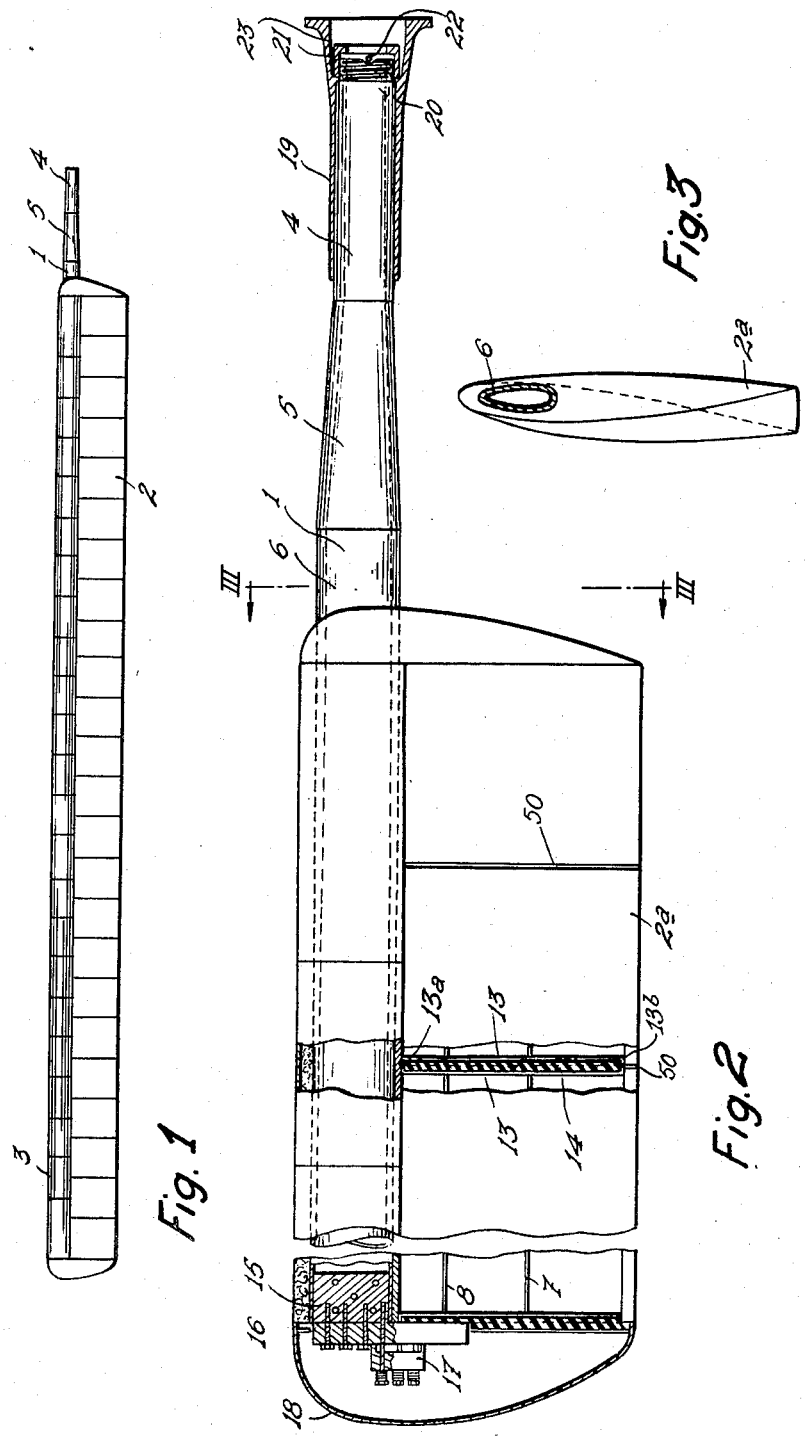

Oct. 4, 1960　　　C. J. MARCHETTI　　　2,954,828
LAMINATED AIRFOIL STRUCTURE
Filed June 10, 1954　　　3 Sheets-Sheet 2
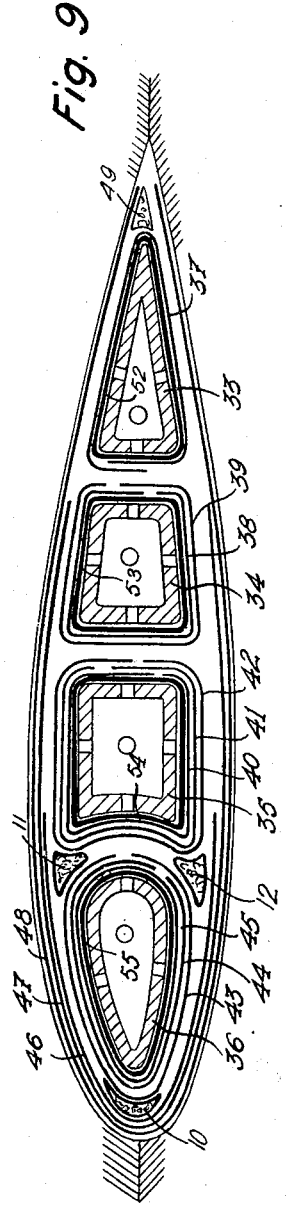

Oct. 4, 1960 C. J. MARCHETTI 2,954,828
LAMINATED AIRFOIL STRUCTURE
Filed June 10, 1954 3 Sheets-Sheet 3

United States Patent Office

2,954,828
Patented Oct. 4, 1960

2,954,828

LAMINATED AIRFOIL STRUCTURE

Charles Joseph Marchetti, Vanves, France, assignor to Sud Aviation Societe Nationale de Constructions Aeronautiques, Paris, France Filed June 10, 1954, Ser. No. 435,880

Claims priority, application France June 19, 1953

6 Claims. (Cl. 170—159)

The present invention relates to airfoils and like streamlined surfaces, notably helicopter blades. The construction of high aspect-ratio wing structures such as helicopter blades has necessitated new techniques for both wooden and metal structures. Also, various plastic materials have been utilized for producing either the wing spar or main structural element of the aerodynamic surface, or the complete streamlined surface as a unitary moulded structure.

Besides, it has already been proposed in the construction of helicopter blades, to form the longitudinal beam or spar by altering the cross-sectional shape of a cylindrical tube except in the wing-root portion thereof to facilitate the connection of the beam with the socket or like member through which the blade is secured on the rotor hub, the profile of the remaining portion of the tube being changed from the initial circular shape to a progressively decreasing cylindrical, substantially square or oval profile, according to the embodiments contemplated, with or without variations in the tube wall thickness.

Moreover, in the construction of metal blades consisting of a relatively large number of parts, it has proved advantageous to so arrange the elements constituting the trailing edge, which are secured on the rear portion of the longitudinal beam, that they contact one another through their front portion while being somewhat separated from one another at their outer portions to avoid abnormal distortions of the trailing edge.

The essential object of this invention is to provide an aerodynamic surface or airfoil characterized by the fact that it comprises a longitudinal tubular spar or beam of progressively decreasing wall thickness toward the tip, the structural shape of the airfoil being provided by a multiplicity of single or composite hollow elements of streamlined shape, made of thin moulded plastic material reinforced with glass fabric, these elements being secured at short intervals on the longitudinal beam and having their leading-edge portions covered by sheet metal protection elements disposed in overlapping relationship to the joints of the aforesaid hollow structural elements, the intervals between these hollow structural elements being filled by a resilient material of cellular or like structure.

The accompanying drawings, forming part of this specification, illustrate diagrammatically by way of example the manner in which the present invention may be carried out in practice, it being understood however that many modifications may be brought thereto without departing from the scope of the invention defined in the appended claims. In the drawings:

Figure 1 is a plan view of a helicopter blade made in accordance with the teachings of this invention;

Figure 2 is a view similar to Fig. 1, showing at a greater scale, with parts broken away, the blade structure mounted on the blade root socket;

Figure 3 is a section taken upon the line III—III of Fig. 2;

Figure 4 is an end view of the longitudinal beam, as seen from the root end of the blade;

Figure 7 is a side view showing the longitudinal beam of Fig. 6 after the wrapping operation;

Figure 9 is a diagrammatical view showing the arrangement of the glass fabric elements in the moulded member of Fig. 5, the thickness of these elements being considerably magnified to illustrate more clearly their arrangement.

Figure 5:
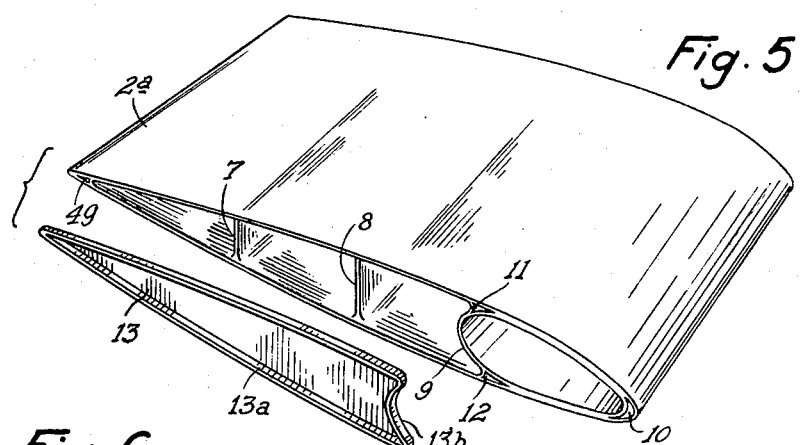
Figure 5 is a perspective view of a box-like member according to the invention, with the side cover plates.

The helicopter blade illustrated in Fig. 1 comprises a longitudinal beam or spar 1 adhesively secured to a plurality of hollow members 2 of very thin reinforced plastic material, the leading edge of the blade being covered with sheet metal elements 3 overlapping the transverse edges of the hollow members 2.

The longitudinal beam 1, as shown in Figs. 2 and 4, consists of a tube the wall thickness of which progressively decreases toward the tip throughout the entire length of beam, this member comprising a cylindrical portion 4, followed by a tapered portion 5 and terminating main portion 6 of torpedo-like cross-sectional shape. The torpedo-like profile exists throughout the length of the last-mentioned beam portion but is slightly twisted through an angle $\alpha$ (see Fig. 4) about its longitudinal axis.

According to a first embodiment of the blade structure which is shown in Figs. 2 and 5, a plurality of box-like members 2a acting as hollow members 2 and having the desired airfoil profile (which is the same for all these members), are mounted and cemented on the portion 6 of the longitudinal beam 1. These box-like members 2a are provided with vertical reinforcing ribs 7, 8 slightly recessed in the member and with a front tubular section 9 having a torpedo-like inner profile greater than, but very close to, the cross-sectional profile of the torpedo-like portion 6 of the beam, in view of properly securing the box-like members on the beam.

As shown in Fig. 5, lightening cores 10, 11, 12 of low-density material are embedded in the plastic material, said cores being shaped to facilitate obtaining a torpedo-like inner profile for the front tubular section 9; besides, another core 49 is located in the trailing edge for joining the upper surface with the lower surface of the blade.

These cores, as already stated, are made of low-density material such as balsa wood and embedded in the structure during the moulding operation, as will be described more in detail in a later part of this description. In addition to their lightening action, they present the formation of resin accumulation likely to distort the profile.

After the moulding operation each box-like member is provided along its transverse edges with cover plates or ribs 13 of the same plastic material as the box-like member; these plates are formed with perpendicular edge portions 13a and 13b through which they are cemented on the hollow members so as to bear against the vertical ribs 7, 8; the adjacent cover plates 13 of a pair of adjacent box-like members 2a will provide therebetween an interval which is subsequently filled with either a mass of sponge rubber or cast cellular material 14, this filling material being cemented to the cover plates so as to provide the required aerodynamic continuity while permitting the twist of the blade due to the gap 50 left by construction between adjacent box-like members. The free end of the longitudinal beam has mounted thereon a fish-plate 15 carrying bolts 16 adapted to secure one or a plurality of statically and dynamically balancing weights 17. The bolts 16 and weights 17 are covered by a wing-tip bay 18.

The blade constructed as described hereinabove is mounted on the blade-root socket 19 of the rotor through a slightly tapered beam portion 4 so as to provide a tight fitting therebetween. Tin solder is then cast between the beam portion 4 and the socket 19 to secure the parts against torsional stresses. The root end of the beam portion 4 is screw-threaded at 20 for receiving a nut 21 locked by a pin 22 and located in a recess 23 formed in the socket 19; the nut 21 abuts the inner annular shoulder of the recess 23 to withstand the centrifugal force developed during the operation of the rotor blade.

Figure 6:
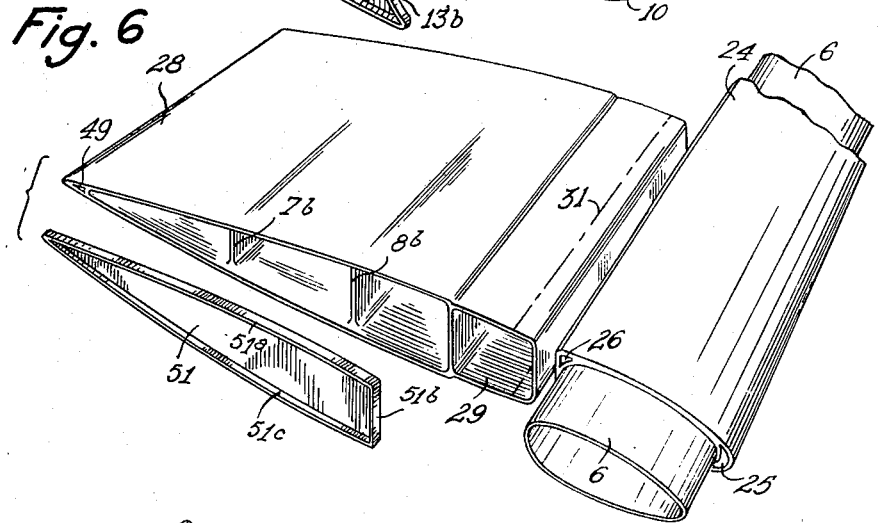
Figure 6 shows an isometric view of a wrapped longitudinal beam, a trailing-edge member adapted to be mounted on this wrapped beam and a side cover plate, before the assembling operation.
Figure 8:
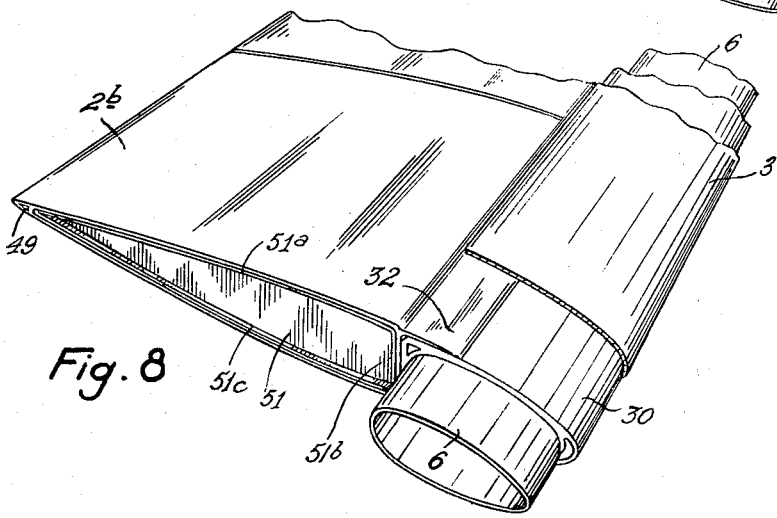
Figure 8 is a perspective view showing one portion of the blade illustrated in Fig. 6 after fitting of the trailing-edge member thereon.

Figs. 6 to 8 illustrate another embodiment of the helicopter blade according to this invention wherein the hollow members 2 are made in a different manner. In this modified structure the torpedo-sectioned portion of the beam 6 is wrapped with plastic material reinforced by layers of glass fabric and provided with embedded lightening cores 25, 26 and 27 similar to the cores 10, 11 and 12 of the preceding embodiment. According to the size of the blades and to the type of mould employed, the longitudinal beam may be wrapped according to two alternate methods. According to the first method, the wrapping may be moulded in order to obtain a front tubular section 24 with an excess thickness and subsequently machined to the required airfoil profile 30 while taking into account the thickness of the leading edge sheet cover members 3; in the other method the wrapping is moulded in vacuo directly to the profile for forming the front tubular section or tubular member 30.

The box-like member 2b is obtained from an initial trailing-edge hollow member 28 of thin plastic material reinforced with layers of glass fabric as in the case of the box-like members 2a, each trailing-edge member being formed with a pair of vertical ribs 7b and 8b, and provided with a box-like member 29.

Each hollow member 28 is closed laterally by a pair of symmetrical cover plates 51 similar to the cover plates 13 of the preceding embodiment; these plates 51 are formed with perpendicular edges 51a, 51b, and 51c. Then the box-like member 29 is cut along the line 31 and the resulting pair of upper and lower strips 32 are fitted on the aft portion of tubular member 30 and cemented thereto through any suitable means, for example by curing, etc. As in the preceding case, an interval is provided between adjacent elements 2b and the space between the cover plates 51 is filled with adequate material as in the case of the intervals 14 of Fig. 2. The other elements of the blade structure are the same, as far as the leading-edge covering, balancing weights, wing-tip bays and blade root structure are concerned, as the embodiment of Figs. 2 to 4.

Figure 9 illustrates the method of constructing a box-like member of the type illustrated in Fig. 5; the thickness of each component element has been purposely magnified in the drawing to afford a clearer understanding of this method. On cores 33, 34, 35 and 36 of a smaller size than those of the box-like member 2a, resilient sheaths 52, 53, 54 and 55 are applied and subsequently wrapped with layers of glass fabric impregnated beforehand with non-polymerised plastic material. The number of glass fabric layers decreases from the leading edge to the trailing edge; thus, for example the core 33 is wrapped in one layer 37, the core 34 in two layers 38, 39, the core 35 in three layers 40, 41 and 42, and the foremost core 36 in three layers 43, 44 and 45. These layers are wound with their junction edges in overlapping relationship. The thus wrapped cores are placed between a pair of moulding flanges reproducing the profiles of the external surface and of the internal surface of the desired air-foil, together with the cores 10, 11, 12 and 49, while the assembly is covered with layers 46, 47 and 48 of glass fabric impregnated with resin, the developed length of these layers decreasing from the inner layer 46 to the outer layer 48. Subsequently, the resilient sheaths 52 to 55 are subjected to a pressure of about one atmosphere (14.7 p.s.i.)—the air inlets thereof being positioned externally of the mould, according to the well-known technique—and as these sheaths are expanded or inflated the glass fabric is tensioned, any excess of plastic material therein is removed, the formation of blisters or trapping of air bubbles is prevented, and the resulting thickness is kept within a limit slightly greater than the thickness of the superposed glass fabric layers. This pressure is maintained in the resilient sheaths until the polymerisation is completed, so that the glass fabric layers impregnated with non-polymerised material are agglomerated for forming the reinforced plastic material.

The box-like members are extracted from the mould with an excess length and reduced to their proper dimension after the setting of the plastic material. The trailing-edge elements 2b of Figs. 6 and 7 are manufactured in a similar manner. Finally, these separate elements are closed by cementing the cover plates 13 or 51 on their side faces.

The wrapping of the longitudinal beam in the case of the embodiment shown in Figs. 6 and 7 is carried out in a three-section mould forming the upper, lower and rear beam surfaces, respectively. Thus, the positioning of the embedded lightening cores and of the glass fabric layers is facilitated. The longitudinal beam is maintained in the mould by end plates closing the mould tightly in view of casting the plastic material at sub-atmospheric pressure.

Preferably, the plastic material is fed to an upper portion of the mould and the suction pipe is connected to a lower portion of the mould.

The advantages resulting from this novel method of constructing helicopter blades are as follows:

(a) the manufacturing procedure is simplified as a whole, which is a very important feature compared with known metal constructions, as a substantial cost reduction is derived from this simplification;

(b) a structurally continuous spar structure is obtained and its fixation to the root socket or like member is facilitated;

(c) the work is split into a plurality of steps whereby the working time about the longitudinal beam is reduced accordingly;

(d) reduction in the weight of the structure;

(e) possibility of constructing blades having a setting variable along its length, this possibility affording the additional advantage of enabling slight constructional defects of linearity and twisting in the beam to be absorbed without any special operation;

(f) the blade structure may be readily modified if desired by changing one type of box-like members for another, for example of different depth;

(g) repair work is simplified and made easier.

Of course, many modifications may be brought to the device described hereinabove and shown in the accompanying drawings. It may also be pointed out that the invention is applicable as well to any airfoils or like aerodynamic surfaces constructed in the manner exemplified hereinabove, such as ailerons or flaps.

What I claim is:

1. In a helicopter blade having a flexible trailing edge and of the type having a tubular spar member of progressively decreasing wall thickness towards the tip thereof, and on which are secured at relatively short intervals boxes while the space between each pair of adjacent boxes is sealed off by a block of sponge rubber, said spar member and boxes defining the airfoil contour of the blade; the improvement according to which each box consists of a hollow element made of thin plastic material, said element having a front tubular section surrounding the spar member and cemented thereon, a rear hollow portion forming the airfoil contour of the blade aft of said tubular section and having a plurality of vertical ribs therein, pairs of symmetrical cover plates laterally cemented on said rear hollow portion along its transverse edges, and lightening cores made of a low-density material and embedded in said tubular section and rear hollow portion, the blade further comprising U-shaped protection elements made of sheet metal and defining the airfoil contour of the leading portion of the blade, said U-shaped elements being cemented to the outer surface of the front tubular sections of the boxes in overlapping relationship to the joints of said boxes.

2. A helicopter blade according to claim 1, wherein the front tubular section of each element is integral with the rear hollow portion of said element and with the vertical ribs, said element being made of thin plastic material with glass fabric reinforcement.

3. A helicopter blade according to claim 1, wherein the front tubular portion of each element consists of a separate tubular member while its rear hollow portion consists of a hollow trailing-edge member integral with the vertical ribs and secured to the aft portion of said tubular member.

4. A helicopter blade, according to claim 1, further comprising means for supporting said blade, said means comprising a socket for the blade root having a hole opening outwardly and an inner recess connected to said hole, the spar element having a slightly tapered root fitted tightly in said hole and a screw-threaded portion penetrating within said recess, a locked nut being screwed on said screw-threaded portion in abutment against a shoulder of said recess, tin-solder being cast between the blade root socket and the slightly tapered portion of the spar element.

5. A helicopter blade, according to claim 1, wherein the lightening cores are formed of balsa wood.

6. A helicopter blade, according to claim 1, wherein the lightening cores are made of a composite material comprising glass and at least one polymerised resin.

References Cited in the file of this patent

UNITED STATES PATENTS

| | | |
|---|---|---|
| 1,433,729 | Kemp | Oct. 31, 1922 |
| 2,183,158 | Bennett | Dec. 12, 1939 |
| 2,376,653 | Boyer | May 22, 1945 |
| 2,414,125 | Rheinfrank | Jan. 14, 1947 |
| 2,445,290 | Gouda | July 13, 1948 |
| 2,467,031 | Hess et al. | Apr. 12, 1949 |
| 2,574,651 | Meyers | Nov. 13, 1951 |
| 2,620,884 | Gluhareff | Dec. 9, 1952 |
| 2,621,140 | Bitterli et al. | Dec. 9, 1952 |
| 2,644,537 | Meyers | July 7, 1953 |
| 2,655,459 | Gordon et al. | Oct. 13, 1953 |
| 2,674,327 | Pullin et al. | Apr. 6, 1954 |
| 2,771,144 | Lasserre et al. | Nov. 20, 1956 |